May 22, 1934. C. H. M. ROBERTS 1,959,385
ELECTRICAL PROCESSES AND APPARATUS FOR SEPARATING EMULSIONS
Original Filed Feb. 18, 1929
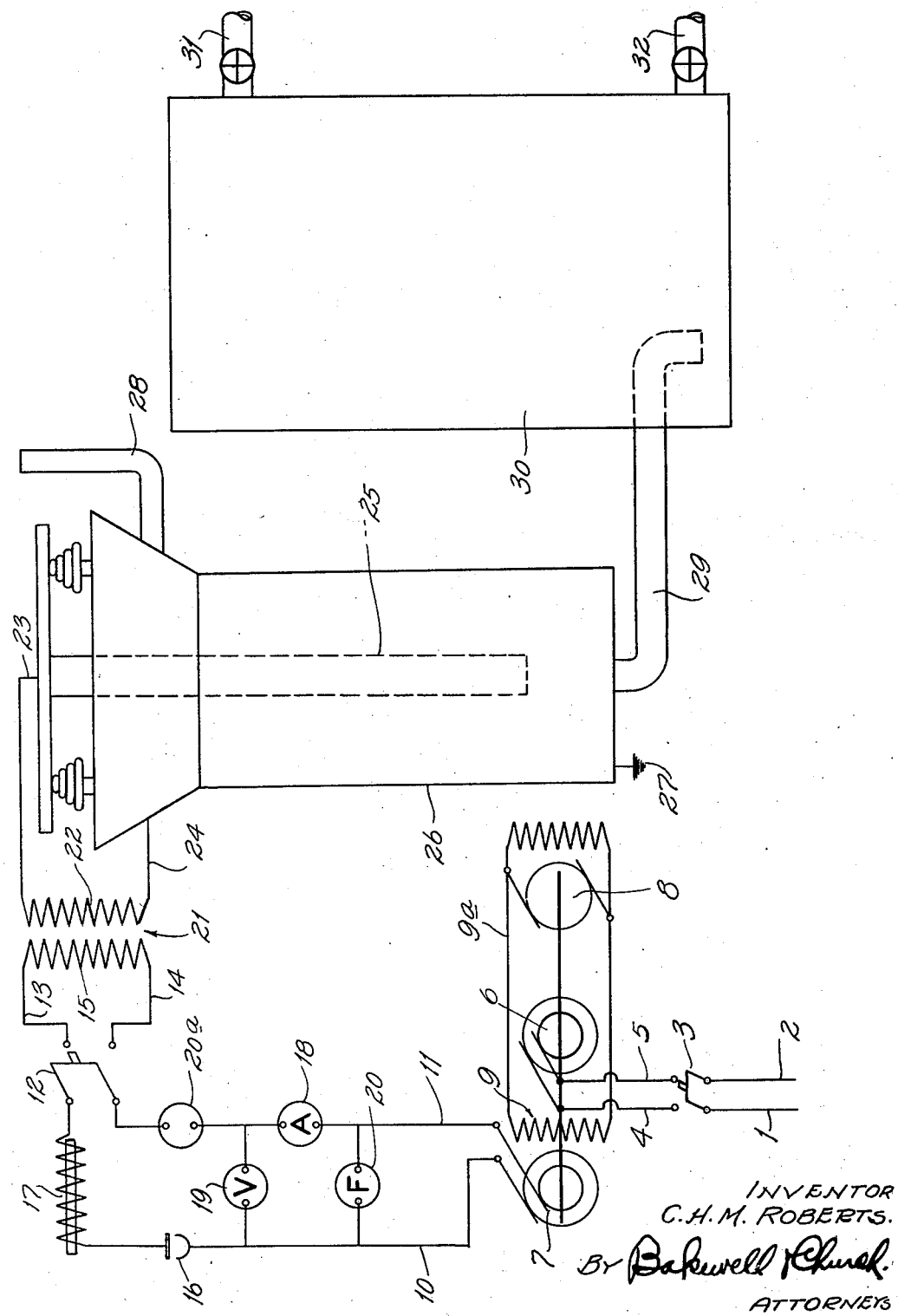
INVENTOR
C.H.M. ROBERTS.
By Bakewell Church.
ATTORNEYS Patented May 22, 1934

1,959,385

UNITED STATES PATENT OFFICE 1,959,385

ELECTRICAL PROCESSES AND APPARATUS FOR SEPARATING EMULSIONS

Claudius H. M. Roberts, Long Beach, Calif., assignor, by mesne assignments, to Petroleum Rectifying Company of California, Los Angeles, Calif., a corporation of California Application February 18, 1929, Serial No. 340,855
Renewed May 22, 1933

2 Claims. (Cl. 204—24)

This invention relates to the art of separating emulsions by the action of electricity, and particularly, to electrical processes of the kind that are used for "breaking" petroleum emulsions of the water-in-oil type, so as to effect the separation of the component parts of such emulsions.

One process, commonly referred to as the "Cottrell Process", that is now in commercial use for breaking petroleum emulsions of the water-in-oil type, contemplates subjecting the emulsion to the action of high potential electricity obtained with either direct or alternating electricity, it being customary to use alternating electricity of commercial frequency, namely 60 cycles, on account of the fact that alternating electricity enables high voltages to be easily obtained, and moreover, avoids undesirable electrolytic corrosion effects. The theory of said process and various ways of carrying out the process are described in U. S. patents to F. G. Cottrell and Cottrell et al., Nos. 987,114, 987,115, 987,116 and 987,117, dated March 21, 1911. Numerous other U. S. patents have been granted since the issuance of the said Cottrell and Cottrell et al. patents, describing more or less similar electrical processes for separating emulsions, among which may be mentioned U. S. Patent No. 1,120,561 to Strong and Nesbit, dated December 8, 1914, and U. S. Patent No. 1,539,647 to Chase, dated May 26, 1915, the two processes last mentioned being distinguished from the Cottrell process by the use of a high potential, high frequency, oscillatory circuit in which the amplitude and damping are controlled, or a high frequency alternating current of the kind used for wireless telegraph practice, and having a frequency in excess of 10,000 cycles per second.

While many petroleum emulsions of the water-in-oil type are capable of being treated successfully with the electrical processes described in the prior art, there are many petroleum emulsions which are difficult to treat successfully with prior known electrical processes, and there are many petroleum emulsions, representing a large proportion of the emulsions encountered in the production of crude petroleum, that are incapable of being broken or separated by prior known electrical processes. Furthermore, there are large quantities of mixed emulsions commonly referred to as "tank bottoms", consisting of mixtures of various kinds of waters, brines, and oils, which, prior to my process, could not be successfully treated electrically.

I have discovered that the frequency of the electricity, employed in electrical processes for separating emulsions, is a factor of considerable importance in the efficiency or success of the process, and that, if the frequency employed is suitable to the particular characteristics of the emulsion being treated, the emulsion will break when subjected to the action of the electric current. Accordingly, I have devised an electrical process for breaking emulsions which differs from prior known electrical processes, in that instead of using electricity of the commercial 60 cycle frequency for all kinds of emulsions, it contemplates the use of alternating electricity having a frequency that has been determined to be suitable for the particular character of the emulsion being treated. It is also distinguished from prior electrical processes by the use of electricity having a frequency substantially higher than the commercial frequency of 60 cycles or less, employed in the Cottrell process, and substantially lower than the "high frequency" or "radio frequency" of 10,000 cycles per second or more, employed in the Strong and Nesbit process and in the Chase process. The potential of the electrical field employed in my process is preferably essentially electrostatic, that is, it is not accompanied by the disruptive passage of current through the emulsion being treated, although this is not detrimental provided the potential is not substantially reduced, except insofar as it increases both the power consumed by the process and the danger of ignition of inflammable vapors.

I have demonstrated that whereas some petroleum emulsions cannot be separated by the action of electricity of the kind heretofore employed, no matter what potential is used, said emulsions can be separated quickly, easily and economically when subjected to the action of electricity having a certain optimum frequency or a frequency within a relatively narrow range, preferably a frequency that will enable the process to be operated at the minimum potential. I have also demonstrated that emulsions capable of treatment with electricity of the kind heretofore employed can be handled to a better advantage, i. e., more efficiently, quickly and at a lower cost, by employing electricity having a certain optimum frequency. The reason for this may be due to the fact that whereas the commercial alternating current of 60 cycles causes a large decrease in the surface tension of both the oil and the brine of the emulsion, the use of a suitably higher frequency produces a small effect on the surface tension of the oil while not sensibly changing the effect on the surface tension of the brine. In this way it is possible to realize a substantial reduction in the difference between the surface tensions of the oil and brine which condition accompanies, if indeed it is not essential, for the successful resolution of petroleum emulsions by electricity.

The frequency of the electricity that is employed to treat a particular emulsion can be determined in various ways, but one convenient and simple method of determining the frequency is to make practical tests to determine (1) the range of frequencies within which the surface tension of the oil is not materially affected by voltage, which I will refer to as the "critical frequency range", and (2) to determine that particular frequency within this critical frequency range which enables the use of the minimum potential, which frequency I will refer to as the "optimum frequency". I have found that the "critical frequency ranges" for various kinds of emulsions are embraced within the maximum limits of about 60 cycles per second to somewhat less than 10,000 cycles per second, while the "optimum frequencies" vary within much smaller limits and usually lie between about 200 cycles per second and 1000 cycles per second.

From the foregoing it will be seen that I have made a discovery that is of great value to the oil industry and which consists of the fact that the alternation frequency of the electricity used to treat a petroleum emulsion to separate the same, is of vital importance and is a factor that has considerable to do with the efficiency and success of the process; also that lower potentials may be used successfully to treat petroleum emulsions, providing the electricity used has a suitable frequency. From this discovery I have been able to devise an electrical process by which many emulsions not capable of satisfactory treatment by the conventional 60 cycle process, can be separated easily, quickly and economically at a minimum potential, which process, briefly stated, consists in subjecting the emulsion to the action of an essentially electrostatic field, having an optimum frequency suitable to the particular characteristics of the emulsion being treated and lying in a range between the commercial power frequencies and the radio frequencies heretofore employed in the treatment of petroleum emulsions. Still another distinguishing characteristic of my process is that it employs an alternating potential that is non-oscillatory, and is undamped, namely, it is of the general character usually furnished by alternating electric generators of customary design.

In practicing my process I prefer, for reasons of availability, convenience, simplicity and economy, to use a generator of alternating potential of approximately 500 cycles per second, operated by a motor of ordinary commercial type, to which electricity is supplied from commercial supply means. If desired, said motor may also be used to operate a direct current generator, to supply excitation current for the 500 cycle generator. The power delivered by the 500 cycle generator, if of suitable potential for the purpose, can be delivered directly to the apparatus, in which the emulsion is treated, to "break" or effect the separation of the component parts of the emulsion. In case the generated voltage at 500 cycles is not of the desired value, I prefer to first deliver it to a voltage transformer, of suitable design for the frequency employed, in order to change the voltage to the desired value. The use of a mechanically operated generating machine, however, is not essential to the success of my process, as any equivalent device, such as vacuum tube frequency generators, frequency transformers, tuned frequency circuits, commutating devices, etc., may be employed, together with any necessary voltage transformers, to produce the necessary frequency, at the desired potential.

In general, a suitable source of alternating electricity at a frequency of 500 cycles will be sufficient, as I have found that this frequency is sufficiently close to the optimum frequency for the majority of emulsions to be suitable for the purpose. For certain emulsions, however, it may be necessary to employ sources of electricity at higher or lower frequencies, but within the maximum limits of 60 to 10,000 cycles per second, in order to obtain the most favorable results from the practice of my invention.

The figure of the drawing is a diagrammatic view of one form of apparatus that may be used to practise my process.

Various types and kinds of apparatus may be used to practise or carry out my process. The accompanying drawing illustrates one suitable form of apparatus, which is provided with a generator that constitutes the source of special frequency power. In the said drawing 1 and 2 designate the commercial electric supply mains from which the operating power is drawn, 3 designates a line switch, connected by wires 4 and 5 to a motor 6, of characteristics suited to the commercial power available, 7 designates a frequency generator, which may produce a voltage of sinusoidal or other desirable wave form, and 8 designates a direct current generator, said frequency generator 7 and said direct current generator 8 being mounted on the same shaft as the motor 6. The generator 8 supplies direct current, for excitation, to the field coils 9, of the frequency generator 7, being suitably connected thereto by the wires $9^a$. The frequency generator 7 is connected by wires 10 and 11 with a switch 12 and thence through wires 13 and 14 to one coil 15, of a suitable voltage transformer 21, of a type suited to the alternation frequency to be used. Suitably connected in the circuit from the frequency generator 7 are a circuit breaker 16, a current limiting or regulating device 17, an ammeter 18, a voltmeter 19, a frequency meter 20, and, when desired, a commutating device indicated by $20^a$, which commutating device may be employed for the purpose of enabling the use of only such part of the voltage wave as may be desired. The other coil 22, of the voltage transformer 21, is connected by wires 23 and 24, respectively, to an insulated electrode 25 and to the shell 26 of any suitable dehydrator, such, for example, as the well-known Cottrell dehydrator, wherein the emulsion to be separated is subjected to the action of the special frequency electricity. The shell 26, of the dehydrator may conveniently be grounded, as indicated at 27. The emulsion to be separated is delivered to the dehydrator through pipe 28, substantially as shown, whence it flows downwardly through the space between the insulated electrode 25 and the shell 26 and is removed from the dehydrator through the pipe 29, being delivered, if desired, into the bottom of a settling tank 30, of well-known design, within which the component liquids are permitted to separate by gravity and from which the separated liquids may be withdrawn through pipes 31 and 32, respectively.

In practising my process, the emulsion to be separated is permitted to flow continuously and at a suitable rate through pipe 28 into the dehydrator, and thence through the dehydrator between the insulated electrode 25 and the shell 26. The switch 3, on the power supply lines 1 and 2, is then closed so as to start the motor 6 and the generators 7 and 8, mechanically connected thereto. The speed of motor 6 is regulated, by apparatus not shown, until the frequency meter 20, in the output circuit of generator 7, indicates the desired frequency, and the current in the field coils 9 of generator 7 is adjusted by regulating the output of generator 8, by apparatus not shown, until the desired output voltage of generator 7 is indicated by voltmeter 19. The circuit breaker 16 and the switch 12 are then closed, thereby energizing the voltage transformer 21, the output voltage of which, at the generated frequency, is delivered through wires 23 and 24, respectively, to the insulated electrode 25 and the shell 26, of the dehydrator. The necessary frequency, at the desired voltage, being impressed upon the emulsion flowing between the electrode 25 and the shell 26, causes the coalescence of the droplets of the dispersed phase. The coalesced liquids then flow out of the dehydrator through pipe 29 and into settling tank 30, wherein they are permitted to separate by gravity into continuous phases, and from which they are withdrawn, as desired, through pipes 31 and 32, respectively.

In treating mixed emulsions such as "tank bottoms" and mixtures of fresh emulsions, it is sometimes necessary to subject the emulsion to repeated action of the electricity, often at different frequencies, in order to effect complete separation of the various constituents of the emulsion. In the event that different frequencies are required, as above explained, these frequencies are determined, as previously described, for each component of the mixed emulsion.

In the foregoing description of my process it is to be distinctly understood that I do not limit myself in any manner to the method or apparatus herein disclosed for practicing the process; the only essential feature of the process being the subjection of the emulsion to be separated to the action of alternating electricity of suitable special frequency and the desired voltage. The special frequency electricity, at any desired voltage, may be produced in any manner and the emulsion, which may consist of any two or more non-miscible liquids, may be subjected to the action of this electricity in any suitable form of apparatus, the component liquids being separated into continuous phases either within said apparatus, or subsequently, in any other suitable apparatus. The process may be used for the resolution of emulsions in which the outer, or continuous, phase is electrically conducting, by interposing a continuous barrier of insulating material between the electrodes in the treating apparatus. While my process is particularly adapted for breaking or separating petroleum emulsions of the water-in-oil type, it is not limited to such use, but is capable of use for resolving other types and kinds of natural and artificial emulsions.

If desired, my process may be used in conjunction with certain auxiliary processes, apparatus, or procedure heretofore used in the treatment of petroleum emulsion and which are well-known in the art.

Having thus described my invention, what I claim as new and desire to secure by Letters Patent is:

1. A process for separating a mixed emulsion, characterized by subjecting the emulsion to repeated action of electricity at different predetermined frequencies, each of which frequencies is adapted for one component of the mixture.

2. A process of treating an emulsion to separate the phases thereof, which process includes the steps of: establishing an alternating high-potential electric field by use of a non-oscillatory alternating potential of a frequency of between 60 and 10,000 cycles per second; subjecting said emulsion to said electric field to agglomerate the dispersed phase thereof; and separating said phases of said emulsion.

CLAUDIUS H. M. ROBERTS.